United States Patent [19]

Fall et al.

[11] 4,188,805
[45] Feb. 19, 1980

[54] TORSIONAL VIBRATION DAMPER

[75] Inventors: Don R. Fall, Oxford; Paul E. Lamarche, Utica, both of Mich.

[73] Assignee: Borg-Warner Corporation, Chicago, Ill.

[21] Appl. No.: 801,989

[22] Filed: May 31, 1977

[51] Int. Cl.² .............................................. F16D 3/14
[52] U.S. Cl. ................................... 64/27 C; 64/27 F; 192/106.1; 192/106.2
[58] Field of Search ..................... 64/27 C, 27 F; 192/106.1, 106.2

[56] References Cited

U.S. PATENT DOCUMENTS

| | | | |
|---|---|---|---|
| 2,321,941 | 6/1943 | Rose | 192/106.2 |
| 2,513,379 | 7/1950 | Thelander | 192/106.2 |
| 2,556,823 | 6/1951 | Saks | 192/106.2 |
| 2,574,573 | 11/1951 | Libby | 64/27 C |
| 3,091,949 | 6/1963 | Sink | 192/106.1 |
| 3,380,566 | 4/1968 | Cook | 192/106.1 |
| 3,931,876 | 1/1976 | Buskow | 192/106.2 |
| 3,938,635 | 2/1976 | Davies | 192/106.2 |
| 3,948,373 | 4/1976 | Wörner | 64/27 F |
| 4,122,931 | 10/1978 | Maucher | 192/106.2 |

FOREIGN PATENT DOCUMENTS 857590  1/1961  United Kingdom ............... 64/27 C

Primary Examiner—Charles J. Myhre
Assistant Examiner—R. C. Turner
Attorney, Agent, or Firm—James A. Geppert

[57] ABSTRACT

A vibration damper assembly for use in a torsional coupling between a driving member and a driven member wherein the damper assembly provides for a very low rate, high amplitude deflection. The vibration damper includes a hub to be received on a driven shaft, two or more groups of springs having multiple springs of the same or various rates within each group operating in series through the use of floating or transfer members movable arcuately relative to the hub, and one or more spring deflection limiting members permitting the tailoring of the damper characteristics more precisely to the requirements of a given coupling assembly.

35 Claims, 15 Drawing Figures

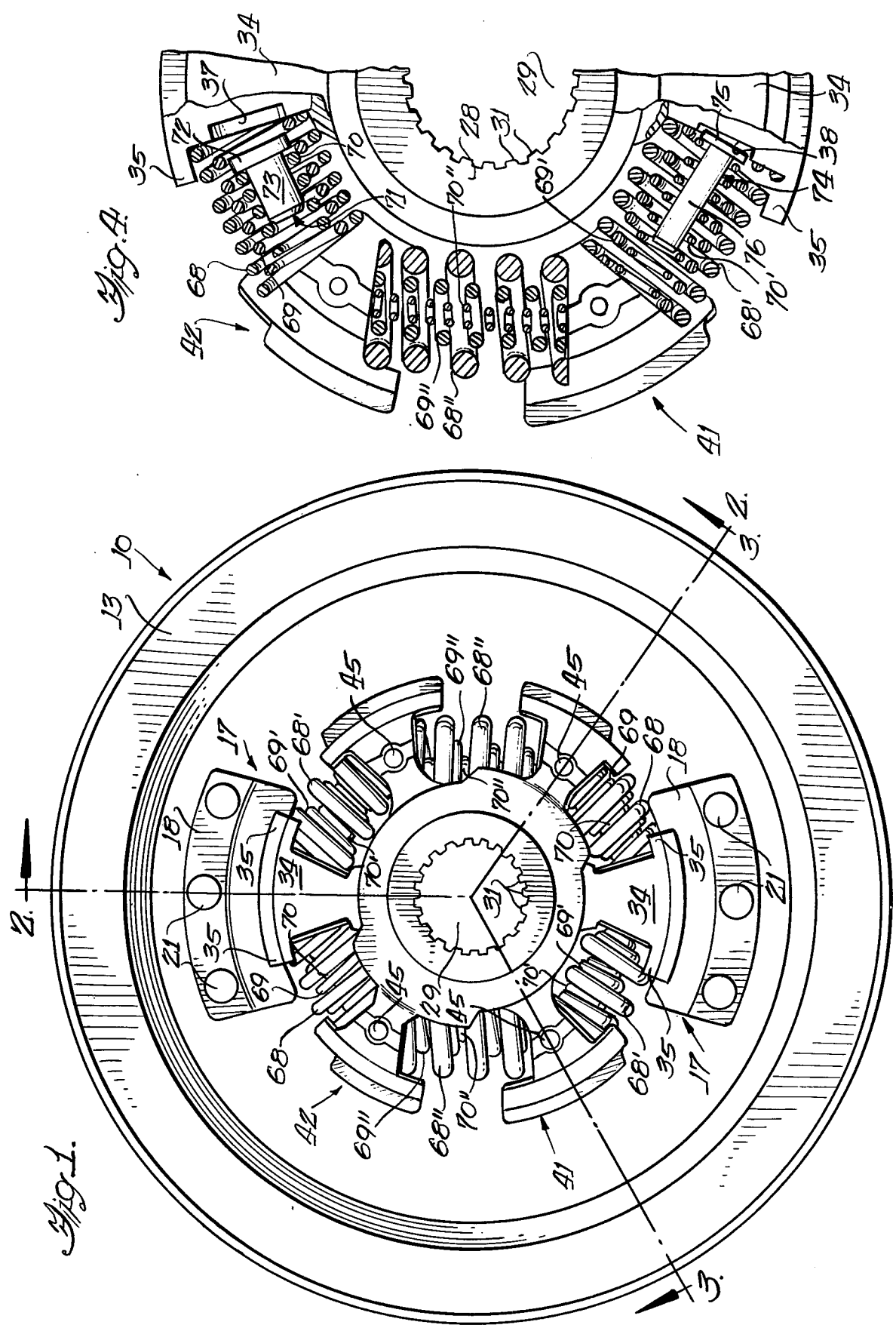

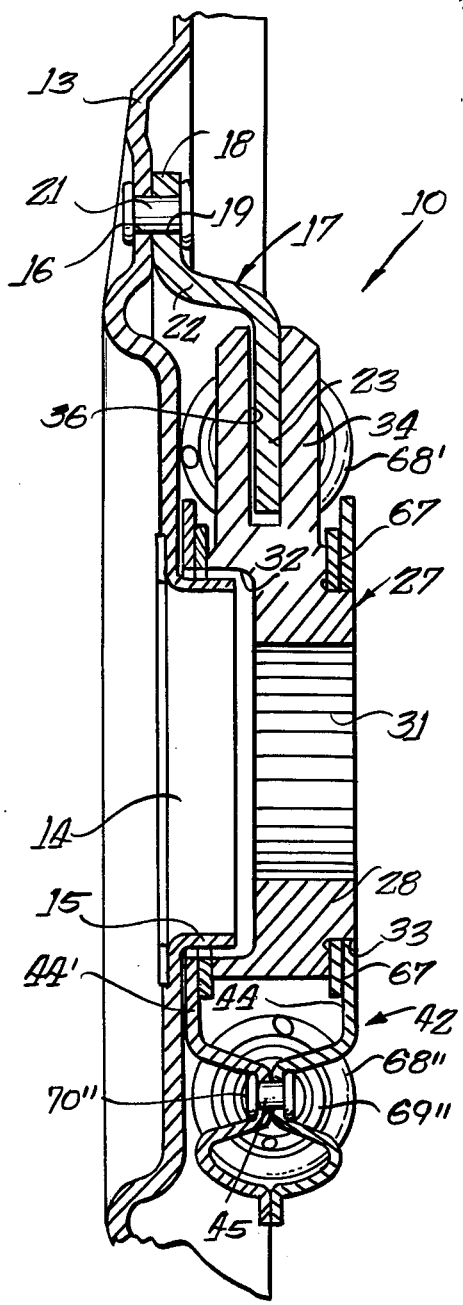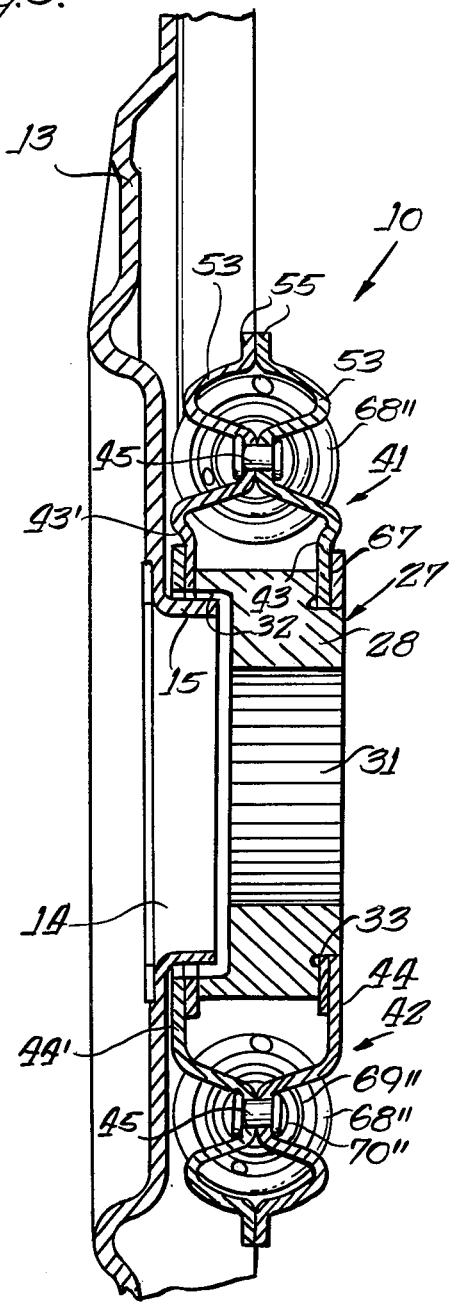

TORSIONAL VIBRATION DAMPER

BACKGROUND AND SUMMARY OF THE INVENTION

It is well known to use a combination spring and friction type vibration damper in a conventional vehicle clutch ahead of a manually operated transmission for the purpose of neutralizing any torsional vibrations emanating from the vehicle engine which would otherwise cause undesirable characteristics, e.g., impact loads, pulsations, noises, etc., in the transmission and driveline during operation of the vehicle.

With an automatic transmission having a constant slipping device, such as a fluid coupling or a hydraulic torque converter, the torsional vibrations in the system are efficiently absorbed hydraulically and a vibration damper has been found unnecessary. However, in order to enhance the fuel economy of an automotive vehicle equipped with an automatic transmission, a lock-up clutch may be incorporated into the fluid coupling or torque converter assembly which, at a predetermined point that may relate to vehicle speed, load, and acceleration, locks up the coupling or torque converter so that slippage does not occur and direct drive results. The lock-up action usually occurs after the automatic transmission has shifted into high gear.

Thus, when locked in direct drive, there is no opportunity for torsional vibrations from the engine to be absorbed hydraulically, and these vibrations tend to manifest themselves in a disturbing manner; the vibrations necessitating a damper assembly in the lock-up clutch device to eliminate the disturbance. Another problem of presently known vibration dampers is that the assembly will only allow a relatively small deflection amplitude. The present invention relates to a vibration damper assembly which will obviate the problems of small deflection amplitude.

The present invention relates to an improved vibration damper assembly which provides for a relatively low rate, high amplitude deflection between the driving and driven members. The assembly includes a hub operatively connected to the driven shaft and having two or more radial arms, a driving plate having at least two driving members, and at least one floating carrier journalled on the hub. Damping springs are positioned between the driving members and the floating carriers to provide an extended arc damping action.

The present invention also comprehends the provision of an improved vibration damper assembly which, in order to suppress torsional vibrations of various natures, permits an almost infinite number of performance curves using various spring combinations. The hub is provided with radially extending arms and each floating carrier is likewise provided with one or more radially extending arms. The arms of these members are circumferentially equally spaced in the inoperative condition by springs positioned between the arms. The hub arms are provided with slots to receive corresponding driving members secured to the driving plate so that the driving members are in axial alignment with the hub arms. The springs are divided into two or more groups operating in parallel with multiple springs of the same or various rates within each group operating in series through the use of the floating carriers.

The present invention further comprehends the provision of an improved vibration damper assembly providing variations in the damper action due to various spring combinations and unique spring deflection limiting members. The arm or arms of each floating carrier and the hub are provided at the outer ends with circumferential lips serving to retain the damper springs with spring deflection limiting members provided in one or more concentric spring sets. As the springs may vary in their rates, the application of torque will cause the lower rate springs to be compressed the most and, simultaneously, the higher rate springs to be compressed the least. When the spring deflection limiting members contact the floating carriers, the spring set or sets containing the limiting members will cease to be further compressed.

Another object of the present invention is the provision of an improved vibration damper assembly that will be equally useful in a torsional coupling between two shafts, a vehicle clutch for a manual transmission, or in a lock-up clutch associated with a hydraulic torque converter.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a rear elevational view of the vibration damper assembly of the present invention.

FIG. 2 is an enlarged cross sectional view of the vibration damper assembly taken on the irregular line 2—2 of FIG. 1.

FIG. 3 is an enlarged cross sectional view taken on line 3—3 of FIG. 1.

FIG. 4 is a partial rear elevational view of the hub and transfer member and spring sets with the input means omitted.

DESCRIPTION OF THE PREFERRED EMBODIMENTS

Figure 8:
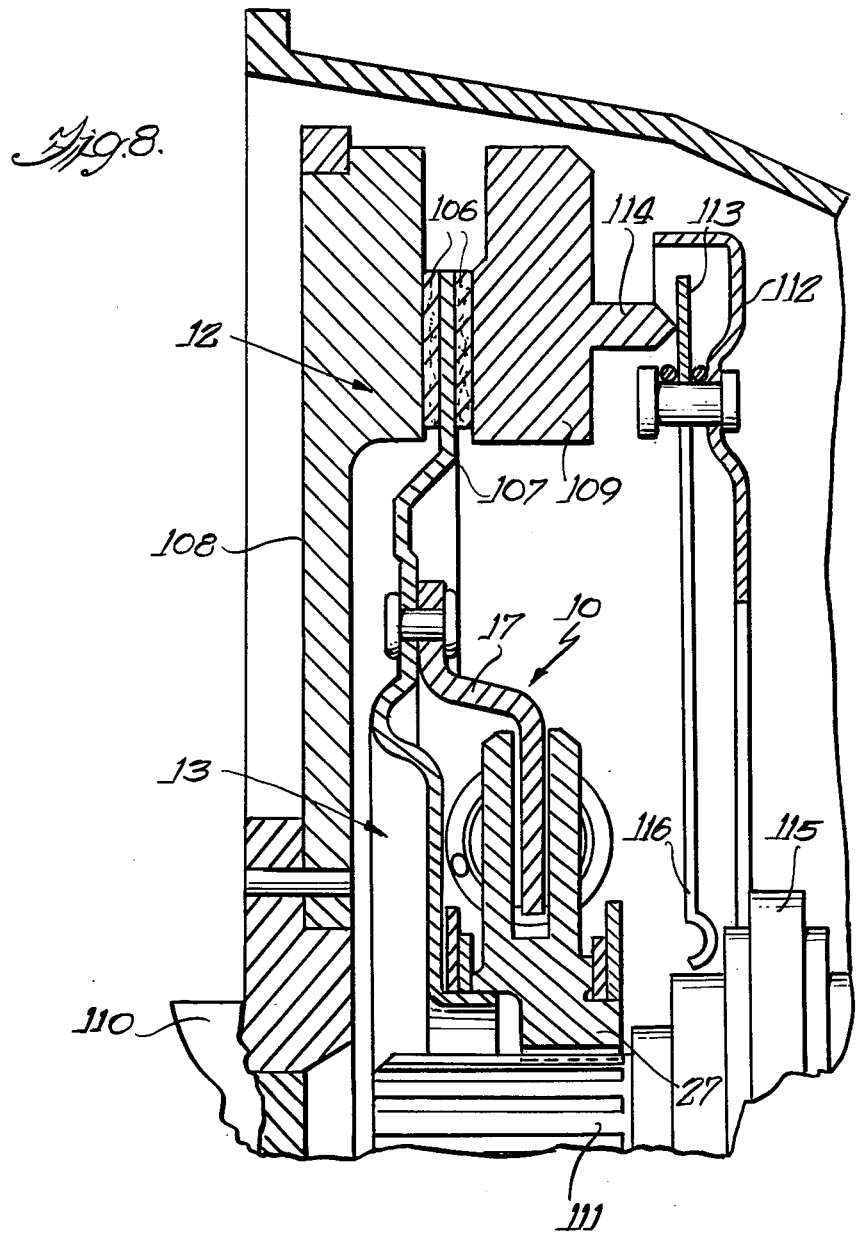
FIG. 8 is a partial vertical cross sectional view through a vehicle clutch for a manual transmission and showing the vibration damper in the clutch.
Figure 6:
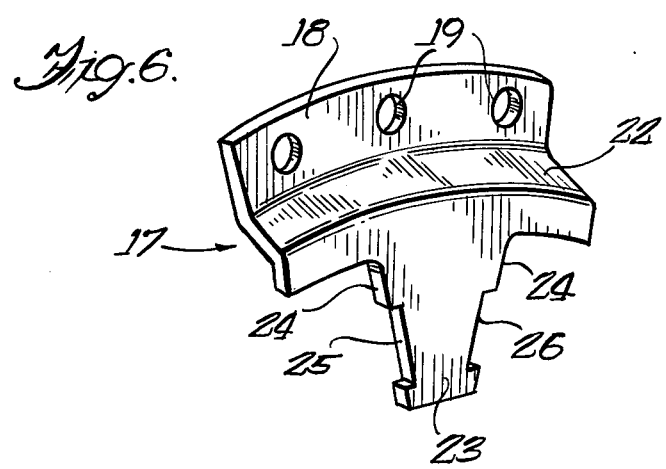
FIG. 6 is an enlarged perspective view of a driving member for the driving plate.
Figure 7:
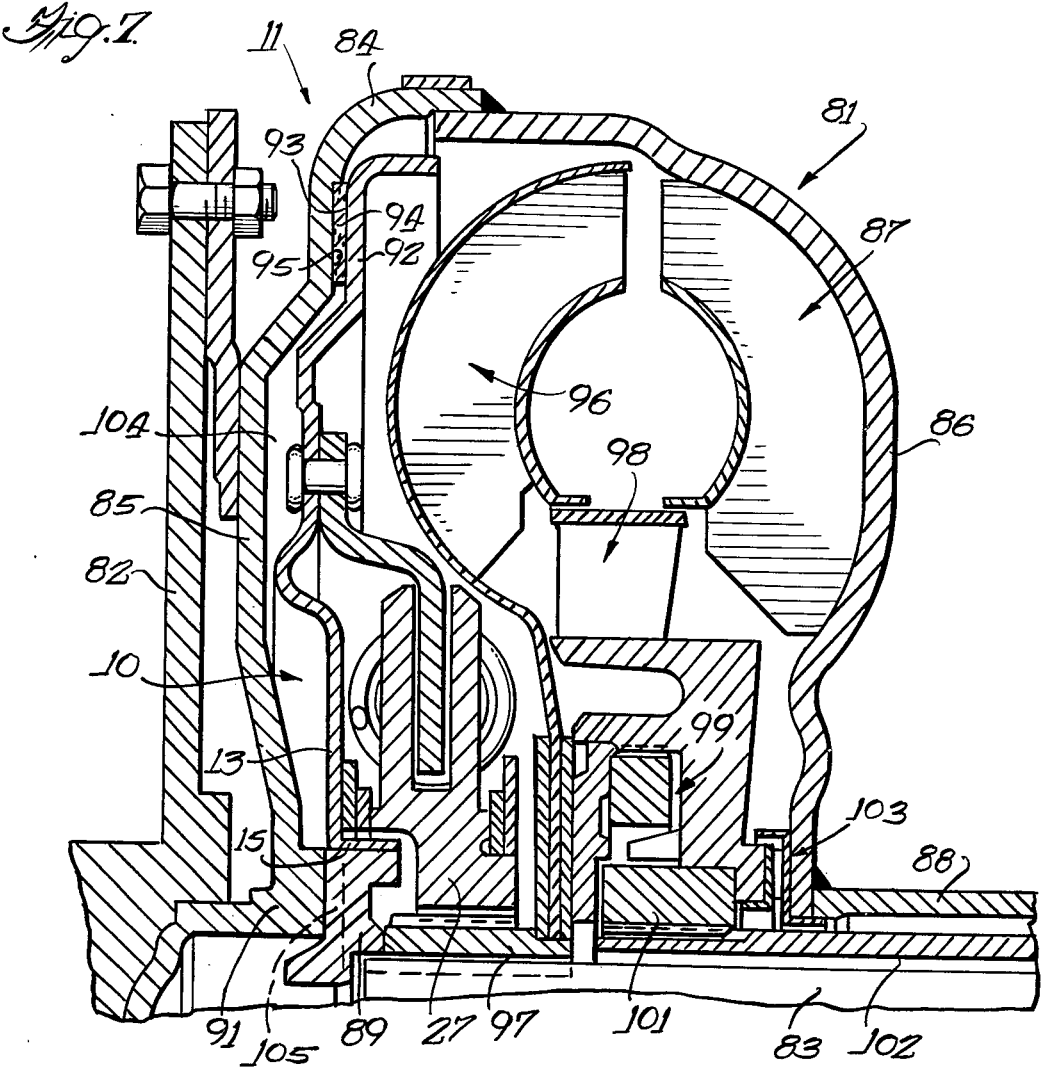
FIG. 7 is a partial vertical cross sectional view through a torque converter and lock-up clutch utilizing the vibration damper assembly.
Figure 10:
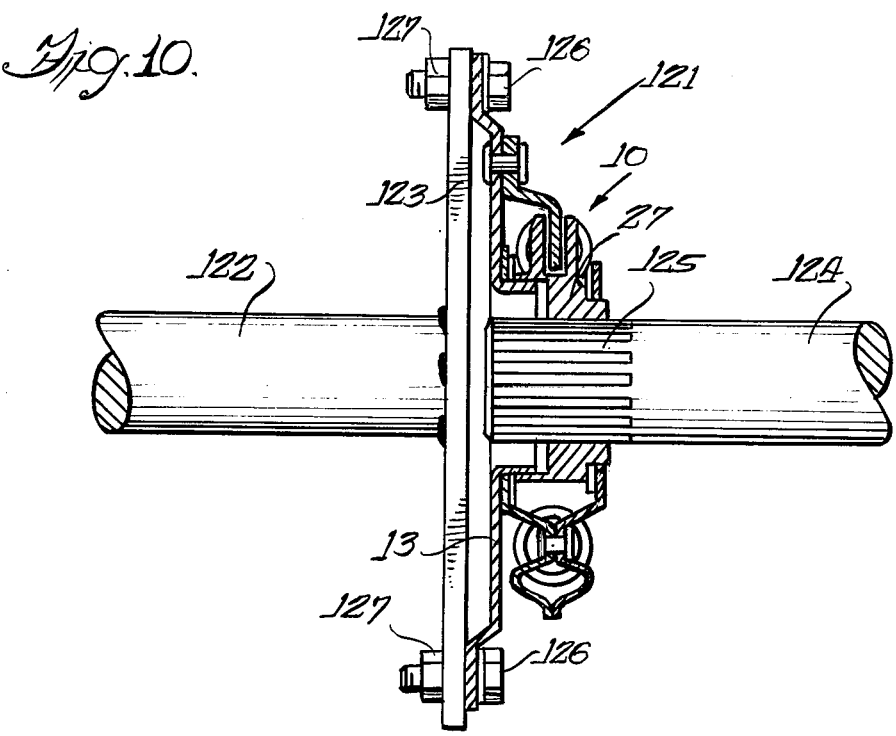
FIG. 10 is a side elevational view partially in cross section of the vibration damper acting as a torsional coupling between two shafts.

Referring more particularly to the disclosure in the drawings wherein are shown illustrative embodiments of the present invention, FIG. 1 discloses a vibration damper assembly 10 adapted to be used in a lock-up clutch 11 shown in FIG. 7, a vehicle clutch 12 shown in FIG. 8, or a torsional coupling 121 shown in FIG. 10. The damper assembly 10 includes a driving plate 13 having a central opening 14 defined by an annular flange 15 and two sets of openings 16 positioned diametrically opposite in the plate 13. A pair of driving members 17, 17 are located on the plate 13, each member having an arcuate base 18 with openings 19 corresponding to the openings 16 to receive rivets 21 to secure the members 17, 17 onto the plate. Each member also has an offset portion 22 terminating in a radially inwardly extending generally triangular shaped finger or tang 23; the opposite edges 24 of the tang having recesses 25, 26 formed therein.

A hub 27 has a body portion 28 with a central opening 29 internally splined at 31 and having a counterbored recess 32 at one side adapted to receive the annular flange 15 on the plate 13. A cylindrical shoulder 33 is positioned on at least one side of the hub body 28. A pair of oppositely disposed arms 34, 34 extend radially outwardly from the hub body to terminate at their outer ends in circumferential flanges or lips 35 extending from opposite edges of each arm 34. A radial slot 36 is cut through the flanges and arm to terminate adjacent the hub body 28 and receive the tang 23 of a driving member 17. The opposite edges of each arm 34 are provided with circular recesses 37, 38 for a purpose to be later described.

Journalled on the hub 27 are a pair of floating carriers or transfer members 41 and 42, each transfer member formed of a pair of mirror-image plates 43, 43' and 44, 44', respectively, located on opposite sides of the hub and secured together by rivets 45. Each plate 43 or 43' includes an annular body or ring 46 or 46' having a central opening 47 or 47', the opening 47 of plate 43 being located on the shoulder 33 on the hub, and a pair of oppositely extending arms 48, 48 or 48', 48', each arm being provided with an outward bend 49 or 49' adjacent the ring and then offset inwardly to provide a base 51 or 51' having an opening 52 or 52'. Beyond the base, the arm is bent outwardly at 53 or 53' and curved inwardly and circumferentially enlarged to provide arcuate lips 54 or 54' terminating in a radial edge or flange 55 or 55'. The lips 54 or 54' and edges 55 or 55' facing the hub arm 34 are cut-away at 56 or 56' sufficiently to receive the edge of the driving member offset portion 22 therein.

Similarly, each plate 44 or 44' includes an annular ring 57 or 57' with a central opening 58 or 58', the plate 44 positioned outside of plate 43 with the opening 58 being journalled on the shoulder 33, and a pair of oppositely extending arms 59, 59 or 59', 59' are bent inwardly to provide an offset securing base 61 or 61' having an opening 62 or 62', an outwardly bent portion 63 or 63' which is then curved inwardly and enlarged to form arcuate lips 64 or 64' terminating in a radial edge or flange 65 or 65'. The lips 64 or 64' and edges 65 or 65' are cut-away at 66 or 66' facing the hub arm 34 for the same purpose as the cut-away portions 56 or 56' on plates 43 or 43'.

Upon assembly, the plates 43 and 43' are positioned facing each other with one plate 43 journalled on the shoulder 33 and the securing bases 51 and 51' and radial edges 55 and 55' abutting. Rivets 45 are inserted through the aligned openings 52 and 52' and headed to secure the plates together. One or more friction shims 67 may be positioned on the shoulder 33 to be located between the inner plate 43 and an outer plate 44 if additional friction damping is required. The plates 44 and 44' are positioned outside of the plates 43 and 43', with one plate 44 journalled on shoulder 33, and the bases 61 and 61' and edges 65 and 65' abutting. Rivets 45 are inserted through aligned openings 62 and 62' and headed to secure these plates together.

Figure 9:
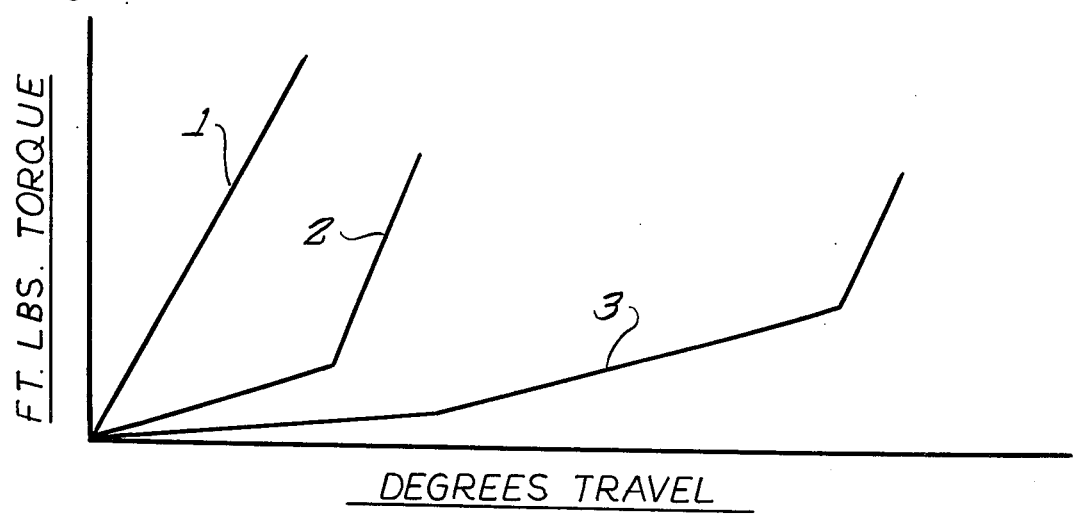
FIG. 9 is graphic representation of the deflection characteristic of the vibration damper assembly of the present invention compared to conventional dampers.

The arms 48, 48' and 59, 59' and the lips 54, 54' and 64, 64', respectively, of the joined plates cooperate with the arms 34, 34 and lips 35, 35 of the hub 27 to form spring pockets for a plurality of springs 68, 69 and 70, which are interposed between the arms 34 of the hub and the arms 48, 48' and 59, 59' of the transfer members 41 and 42 to substantially circumferentially equally space the arms. The springs are provided as a concentric nest of an outer spring 68, a smaller intermediate spring 69 and a still smaller inner spring 70. To change the slope of the curve representing the deflection characteristics (see curve 3, FIG. 9), a pair of spring deflection limiting members or pins 71 and 74 may be located on each edge of each hub arm 34 to limit the amount of compression on the springs. The limit pin 71 has a head 72 adapted to be received in the recess 25 in tang 23 and recess 37 in the hub arm 34 with a shank 73 extending into the inner spring 70. Likewise, the limit pin 74 has a head 75 adapted to be received in a recess 26 of the tang 23 and recess 38 in the arm 34 with a shank 76 extending into the inner spring 70. Although three springs are shown for each pocket, a single spring 68, two concentric springs 69, 70, or more concentric springs may be utilized depending on the desired conditions of use as will be later described.

As seen in FIG. 7, the vibration damper assembly 10 may be utilized in a lock-up clutch assembly 11 for an automatic transmission wherein a torque converter 81 is interposed between the flywheel 82 driven by the vehicle engine (not shown) and the driven shaft 83. A rotatable housing 84 is secured to the flywheel and includes a forward portion 85 and a rearward portion 86 forming the outer shell of the impeller 87 for the torque converter; the portion 86 being secured at its inner edge to an impeller hub 88. An annular ring 89 is positioned to abut the forward portion 85 adjacent its inner periphery 91 and is received within the flange 15 of the driving plate 13. The driving plate 13 is provided with a radially undulating contour resulting in a clutch piston 92 having a flat annular friction surface 93 with a suitable friction material 94 affixed thereto. The forward housing portion or input means 85 is also provided with an interior annular clutching surface 95 thereon facing the surface 93.

The torque converter includes the impeller 86, a turbine 96 mounted on an annular hub 97 splined to the driven or output shaft 83, and a stator 98. The stator is suitably connected, such as by a one-way clutch 99, to an inner race 101 that is splined onto a stator reactor sleeve 102 concentrically arranged between the impeller hub 88 and the output shaft 83. Also, the hub 27 of the vibration damper assembly 10 is splined onto the turbine hub 97, which in turn is splined onto the output shaft 83. Suitable bearings (not shown) are disposed between the various concentrically arranged shafts for maintaining proper alignment and independent rotation of each, and annular thrust bearing means 103 is provided between the stator hub and the inner radial surface of impeller 87 and has openings extending radially therethrough to provide passageways for the flow of oil into the housing 84.

With respect to actuation of the clutch piston 92, fluid pressure is always present in the chamber of the torque converter 81 and, when the transmission is in neutral or in an accelerating condition, a higher pressure is supplied through a separate circuit, such as through a passage (not shown) in the output shaft 83, to enter the chamber 104 between the forward portion 85 of the housing and the clutch pistion 92 through openings 105 formed in the ring 89. This pressure urges the piston to the right, as seen in FIG. 7, to retain the lock-up clutch in a disengaged condition while driving in the lower gears through the torque converter. When the transmission shifts into high gear, the pressure to the chamber 104 is dropped to a level below that existing in the torque converter, possibly to zero, so that the full fluid pressure in the torque converter is effective to urge the clutch piston 92 to the left, thus engaging the friction surface 93 and friction material 94 thereon with the clutch surface 95 in the housing 84 to provide a one-to-one lockup, resulting in a direct drive between the flywheel 82 and housing 84 and the output shaft 83 through the clutch piston 92 and vibration damper assembly 10.

As seen in FIG. 8, the vibration damper assembly 10 is also capable of usage for a vehicle clutch 12 between the engine and manual transmission of an automobile or truck. The driving plate 13 is journalled within the hub 27 with axial movement of the assembly 10 being permitted during operation through the splined connection to an output shaft leading to the manual transmission (not shown). The driving plate is generally flat and has annular friction material faces 106, 106 adjacent the outer periphery thereof to provide a friction clutch plate 107. A flywheel 108 is mounted on a driving shaft 110 from the engine (not shown) and a conventional pressure plate 109 is positioned on the side of the clutch plate opposite the flywheel. The hub 27 of the assembly 10 is mounted on the splined end of the driven shaft 111, and a clutch housing 112 enclosing the pressure plate and damper assembly 10 is secured to the flywheel 108. A Belleville spring 113 is pivotally mounted in the clutch housing with its outer periphery engaging a fulcrum 114 on the pressure plate 109, and a release bearing 115 is axially reciprocable relative to the shaft 111 to engage the inner ends of fingers 116 formed in the spring. As is conventional in vehicle clutches, the flywheel, clutch housing and pressure plate rotate together and the clutch plate 107 is engaged and disengaged in a conventional manner.

FIG. 10 discloses the broader concept of the use of the vibration damper assembly 10 as a torsional flexible connection 121 between a pair of axially aligned shafts. The input or driving shaft 122 has a radial flange 123 secured to the free end thereof, and the output or driven shaft 124 has a splined end 125 receiving thereon the hub 27 of the damper assembly. The plate 13 is suitably secured to the radial flange 123 as by bolts 126 and nuts 127 extending through aligned openings in the flange 123 and plate 13. This arrangement will operate as a flexible coupling between the two shafts 122 and 124 in the manner described below.

Now considering the operation of the vibration damper assembly 10, the two drive members 17, 17 transmit torque from the driving plate 13 through the springs and transfer members 41, 42 to the hub 27. The springs are divided into two groups acting in parallel with three sets of springs acting in series in each group. The lowest rate springs are denoted as 68, 69 and 70 positioned in the pocket formed between the hub arm 34 and the transfer member 42, while the springs 68', 69' and 70' have either an intermediate rate or rate equal to the lowest rate and are positioned between the hub arm 34 and the transfer member 41. Springs 68", 69" and 70" have either the highest spring rate or rate equal to the intermediate spring rate and are located in the pocket between the transfer members 41 and 42. A limit pin 71 is positioned within springs 68, 69, 70 with its head 72 adjacent the pocket 37 in the hub arm 34, and a second limit pin 74 is received within springs 68', 69', 70' with its head 75 adjacent the pocket 38 in the opposite hub arm (FIG. 2). These three spring sets constitute one group and the second group comprises springs in diametrically opposite pockets having the same characteristics.

To change the slope of the curve representing the deflection characteristic (see curve 3 of FIG. 9), the spring deflection limiting members 71, 74 act as stops to limit the compression of the springs. Thus, in the torsional connection 121 or when the driving plate is engaged, through lock-up of the clutch of FIG. 7, during acceleration, or engagement of the clutch plate of FIG. 8, the torque may be high or moderate depending on the degree of acceleration, and the springs 68, 69, 70 having the lowest rate will be compressed the most by the drive tangs. Assuming the springs 68', 69', 70' and 68", 69", 70" have intermediate and/or higher spring rates, respectively, they will also be compressed, but to lesser degrees. If the last two spring sets each have the same rate as the first, they will be compressed to the same degree as springs 68, 69, 70. As the torque is increased, the limit pins 71, 71 will contact the transfer member 42, assuming counterclockwise rotation, transferring the torque through the springs 68", 69", 70" of both groups to the springs 68', 69', 70' and then to the output hub 27. With a continued increase in torque, the springs 68', 69', 70' are compressed to where the limit pins 74, 74 now contact the transfer member 41, leaving only the springs 68", 69", 70" yieldably transmitting torque. Conditions, of course, instantly change as engine torque output varies in relation to throttle manipulation. When coasting, the sequence of events is the same as that just described except that the hub arms 34, 34 are now applying torque with the engine acting as a brake.

The groups of springs in this damper assembly act in parallel and their loads are additive. Within each group, the sets of springs act in series and are not additive. Thus, the individual deflection rates are compounded. Observing the curves on the graph of FIG. 9, curve No. 1 represents the deflection and torque of a conventional damper assembly and curve No. 2 shows the deflection and torque of a conventional damper design, heretofore considered of high amplitude, such as the damper shown in U.S. Pat. No. 3,266,271. In contrast to this, curve No. 3 discloses the deflection and torque for the vibration damper assembly of the present invention. As can be seen from this comparison, the present damper assembly provides a maximum deflection which is approximately two and one-half times that provided by the conventional damper at the same torque load.

The damper assembly 10 shows friction shims only between the transfer members on the rear side of the assembly. If greater friction is required, additional shims may be positioned between the hub and inner transfer member 41 or, with suitable piloting, between the transfer members on the front side of the assembly.

Conversely, if less friction is required, the shims shown in the damper assembly 10 can be reduced in number or eliminated entirely. Although this vibration damper assembly is shown for a torsional coupling, a lock-up clutch in a torque converter, or for a vehicle clutch used with a manual transmission, the damper can be used for other industrial torsional vibration damper applications requiring a low rate of deflection since other deflection characteristics can be obtained depending on the choice of springs and/or spring deflection limiting members.

Figure 5:
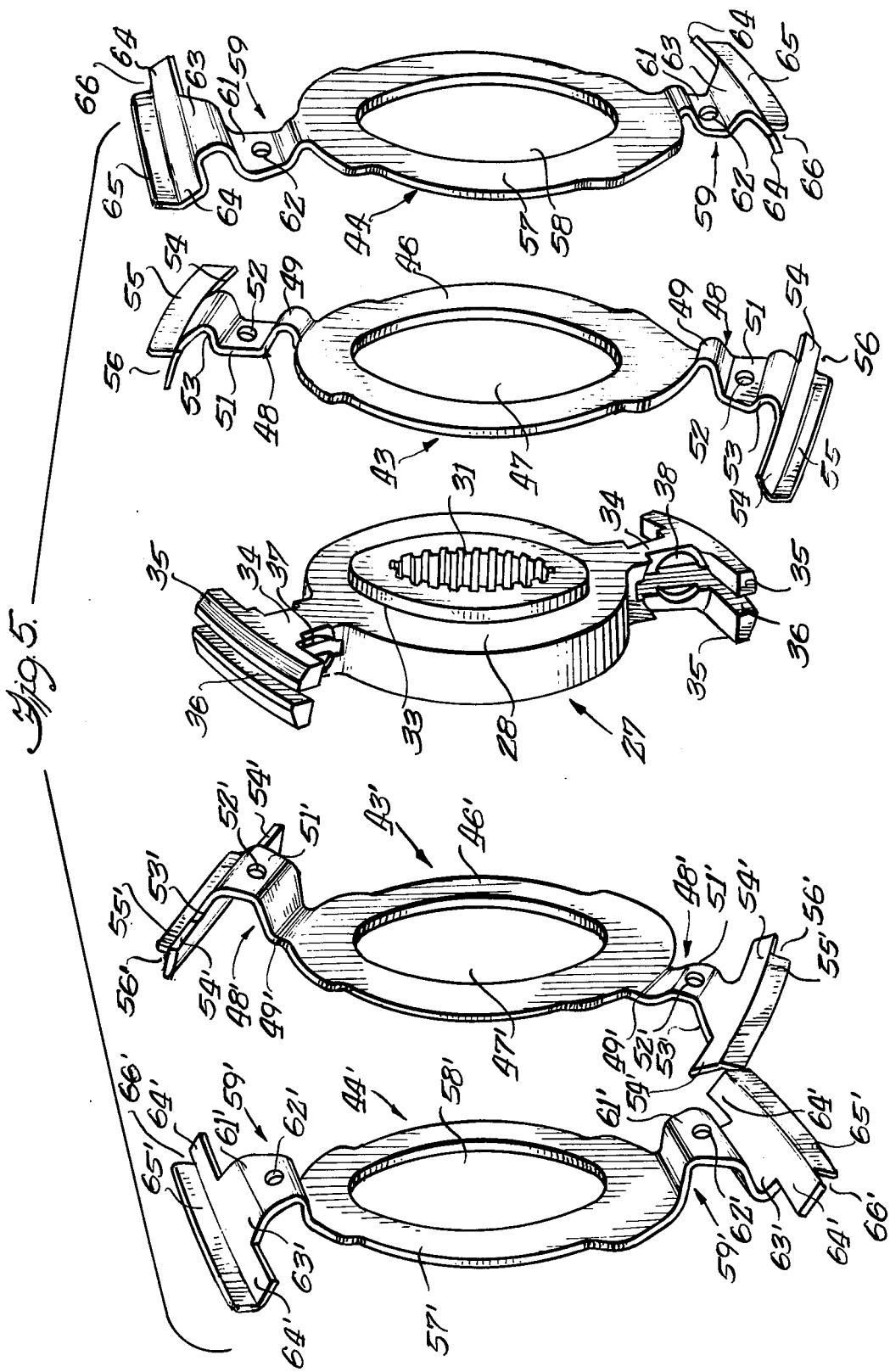
FIG. 5 is an exploded perspective view of the hub and transfer members for the damper assembly.
Figure 11:
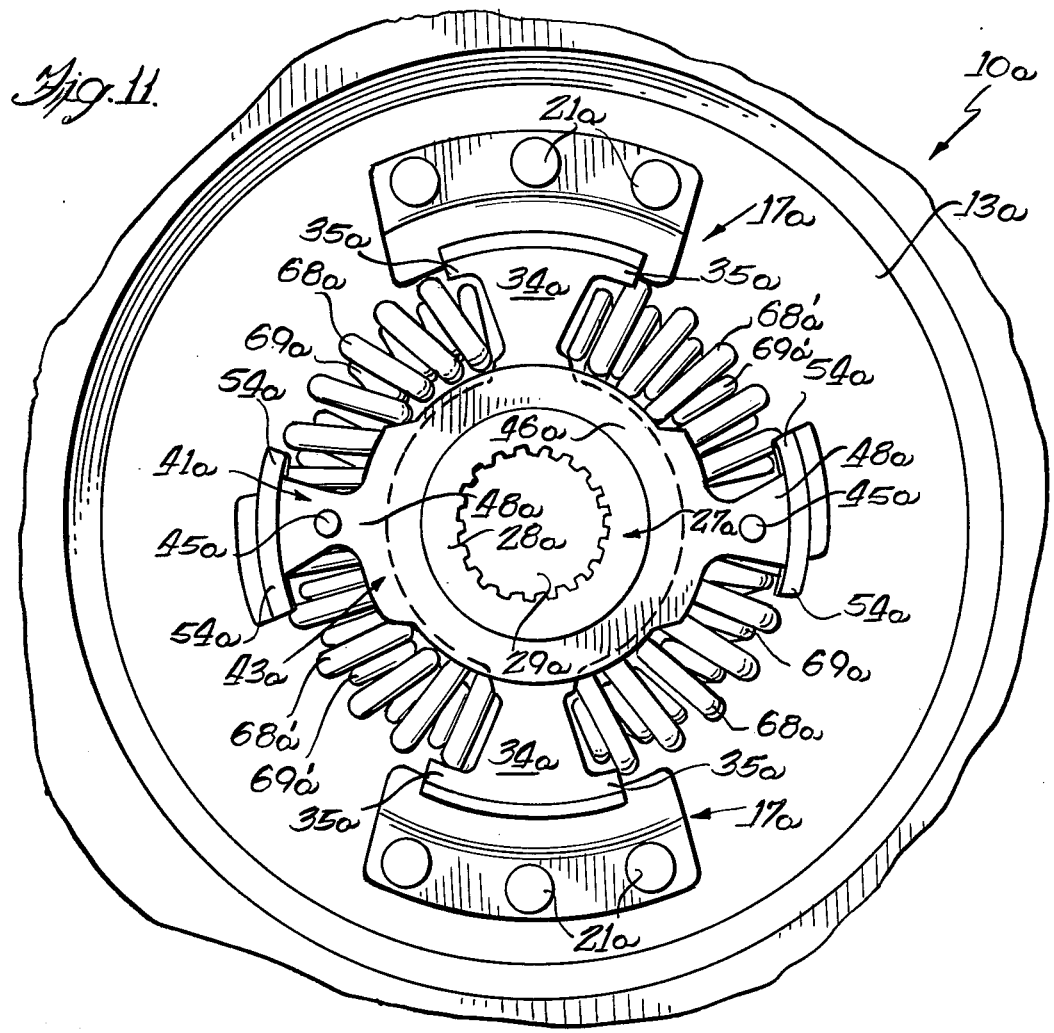
FIG. 11 is a partial rear elevational view of a second embodiment of vibration damper assembly.

FIG. 11 relates to an alternate embodiment of vibration damper assembly 10a including a driving plate 13a having a pair of driving members 17a, 17a secured thereto by rivets 21a, and a hub 27a having a body portion 28a with a splined opening 29a to receive an output shaft (not shown) and a pair of circumferentially slotted radially extending arms 34a terminating in lips 35a. Journalled on the hub 27a is a transfer member 41a formed of a pair of mirror-image plates 43a located on opposite sides of the hub and secured together by rivets 45a. Each plate includes an annular body 46a and a pair of oppositely extending arms 48a terminating in arcuate lips 54a. Each plate has substantially the same configuration as the plates shown in FIG. 5.

This vibration damper configuration provides four spring pockets rather than the six pockets in the embodiment of FIG. 1, with each pocket containing a single spring or two or more nested springs. The springs are arranged in two groups acting in parallel with each group having two sets of springs acting in series. Each spring set is shown with concentric springs 68a, 69a and 68a', 69a', respectively, although one spring or three or more concentric springs could be used in each pocket. The lower rate springs 68a, 69a are located in oppositely disposed pockets, while higher rate springs 68a', 69a' are located in the other two pockets. This damper assembly is operated in a generally similar manner to that previously disclosed, except torque is transferred through two sets of springs and one floating member rather than the three sets of springs and two floating members of FIG. 1.

Figure 12:
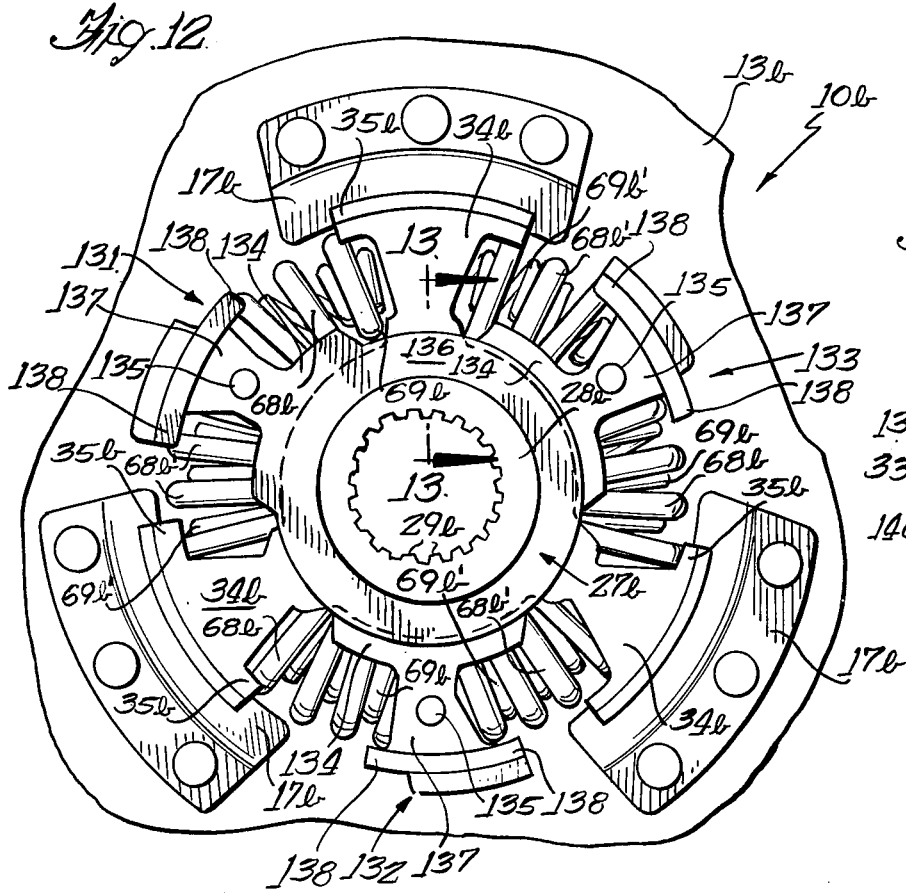
FIG. 12 is a partial rear elevational view of a third embodiment of vibration damper assembly.
Figure 13:
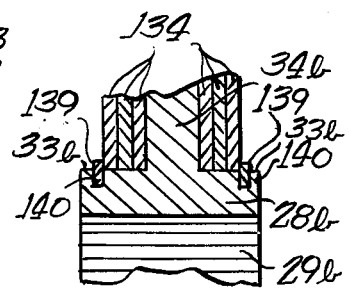
FIG. 13 is a partial cross sectional view taken on the line 13—13 of FIG. 12.

FIGS. 12 and 13 disclose a third embodiment of vibration damper assembly 10b having a driving plate 13b with three circumferentially equally spaced driving members 17b suitably secured thereto and a hub 27b having a body portion 28b with a splined central opening 29b and three circumferentially equally spaced radially extending arms 34b slotted to receive the driving members therein and terminating in lips 35b. Journalled on the hub are three transfer members 131, 132, 133, each member formed of two plates 134 secured together by rivets 135.

The plates 134 are mirror-images with each plate including an annular body 136 having one generally radially extending arm 137 with an inwardly offset securing portion provided with an opening therein to receive the rivet 135; the arm terminating in circumferential lips 138. As three pair of plates are journalled on the hub, the arms of each pair of plates will necessarily be bent on a slightly different configuration in a manner similar to that shown in FIG. 3 and retaining rings 139 are received in annular grooves 140 (see FIG. 13) formed in the cylindrical shoulders 33b on the hub body 28b to retain the bodies 136 on the hub. Between the arms 137 of each transfer member and the arms 34b of the hub are formed six spring pockets to receive three groups of springs with two sets of springs in each group.

As shown, springs 68b, 69b, 68b', 69b' are utilized in the pockets, although a single spring or three or more concentric springs could be used. The operation of this embodiment is similar to the previous embodiments except there are three groups of springs acting in parallel with each group comprising two spring sets acting in series; the driving members 17b moving due to rotation of the plate 13b and acting against the springs 68b, 69b of each group. As these springs are compressed, the transfer members 131, 132, 133 will rotate relative to the hub to compress the springs 68b', 69b'. This arrangement will, of course, adapt to changes in engine torque.

Figure 14:
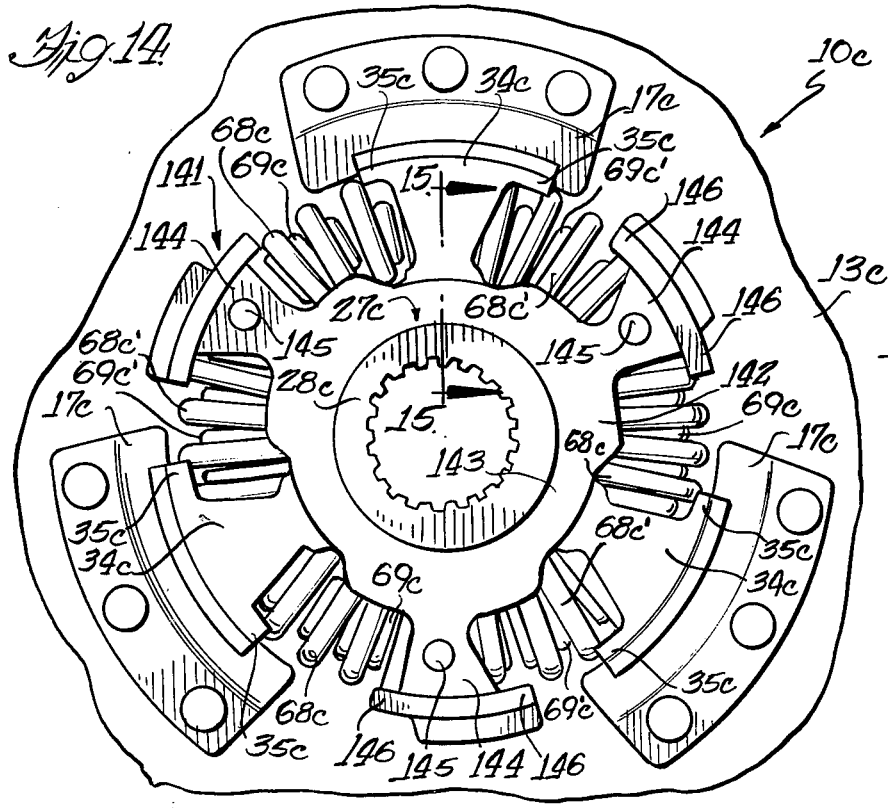
FIG. 14 is a partial rear elevational view of a fourth embodiment of vibration damper assembly.
Figure 15:
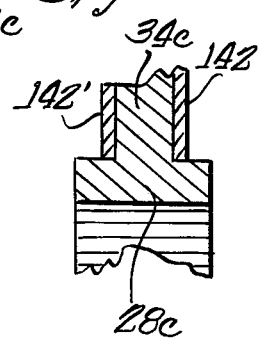
FIG. 15 is a partial cross sectional view taken on the line 15—15 of FIG. 14.

FIGS. 14 and 15 disclose a fourth embodiment of vibration damper assembly 10c utilizing a driving plate 13c having three circumferentially equally spaced driving members 17c secured thereto and a hub 27c with a body portion 28c and three circumferentially equally spaced radially extending arms 34c terminating in lips 35c and slotted to receive the inner ends of the driving members 17c therein. Journalled on the hub is a single transfer member 141 including a pair of mirror-image plates 142, 142', each plate having an annular body 143 and three circumferentially equally spaced radially extending arms 144, with the arms of the plates secured together by rivets 145 and terminating in circumferential lips 146. Between the arms 34c of the hub and the arms 144 of the transfer member 141 are provided six spring pockets to receive springs 68c, 69c and 68c', 69c' arranged in three groups with two sets of springs in each group. Although shown as two concentric springs in each set, a single spring or three or more concentric springs can be provided for each pocket.

As the driving plate 13c is rotated, assuming counterclockwise rotation as seen in FIG. 13, the driving members 17c engage the springs 68c, 69c of each first pocket between a hub arm 34c and the arm 144 of transfer member 141, and compression of the springs 68c', 69c' in each of the other pockets proceeds serially with the springs 68c', 69c' acting against the respective hub arms 34c. This arrangement will provide substantially the same deflection charcteristics as the embodiment of FIGS. 12 and 13.

The spring rates and number of springs in the various pockets of these additional embodiments may be different to provide desired deflection curves and, although not shown, one or more spring deflection limiting members may be incorporated in these other embodiments as required. Also, friction shims may be provided between the various plates. All of these embodiments can be utilized in a torsion coupling, a vehicle clutch or the lock-up clutch in a torque converter.

We claim:

1. A vibration damper assembly to transmit torque between driving and driven elements comprising a hub operatively connected to an output shaft, mounting means operatively associated with torque input means, said hub having a central body portion and at least two radially extending arms, each arm having a circumferentially extending slot therein, at least one floating means adapted to move arcuately about the hub relative to said arms, resilient means interposed between each of said arms and said floating means, and a driving member aligned with each hub arm and operatively connected to said mounting means, each driving member including a base portion on said mounting means and an offset tang received in said hub arm slot and extending inwardly into the path of and adapted to engage said resilient means, each floating member having an annular body portion and at least one radial arm extending therefrom and terminating in circumferentially extending lips having a notch at at least one end adapted to receive a portion of a driving tang.

2. A vibration damper assembly as set forth in claim 1, in which each driving member has a generally T-shape, and each tang has outwardly diverging edges adapted to engage said resilient means.

3. A vibration damper assembly as set forth in Claim 1, in which each hub arm has a pair of outwardly diverging sides generally aligned with said resilient means.

4. A vibration damper assembly as set forth in claim 1, in which said floating means includes one or more members which are guided independently of each other in a circumferential path about said hub.

5. A vibration damper assembly as set forth in claim 4, in which said hub has a body portion with at least one cylindrical shoulder formed thereon, and each floating member has an annular body portion journalled onto the shoulder of said hub body portion and at least one radial arm extending therefrom.

6. A vibration damper assembly as set forth in claim 5, in which said hub arms extend from the body portion and terminate in circumferentially extending lips and said floating member arms terminate in circumferentially extending lips, said hub arms and lips and said floating member arms and lips forming a plurality of pockets to receive said resilient means.

7. A vibration damper assembly as set forth in claim 6, in which said resilient means comprises two or more groups of compression springs acting in parallel with multiple springs within each group operating in series.

8. A vibration damper assembly as set forth in claim 7, including spring deflection limiting means positioned in said multiple springs of each group.

9. A vibration damper assembly as set forth in claim 5, in which said hub body portion includes a central opening receiving said output shaft and a counterbored recess facing said mounting means.

10. A vibration damper assembly as set forth in claim 7, in which each group of springs has two or more sets of springs and each set of springs includes at least one compression spring.

11. A vibration damper assembly as set forth in claim 7, in which each group of springs has at least one spring set comprising a single spring and the remaining spring sets having two or more concentric springs.

12. A vibration damper assembly as set forth in claim 10, including one or more spring deflection limiting members positioned in the spring sets of each group adjacent the hub arms.

13. A vibration damper assembly as set forth in claim 12, in which said spring deflection limiting members are limit pins with each pin having an enlarged head, each hub arm having a pocket formed in the opposite edges thereof adapted to receive the head of a limit pin therein.

14. A vibration damper assembly as set forth in claim 13, in which each hub arm has a central circumferentially extending slot therein, and said drive means includes a tang extending into each said slot.

15. A vibration damper assembly as set forth in claim 14, in which each drive tang has outwardly diverging edges, each edge having a recess generally aligned with a pocket in said hub arm and adapted to receive the head of a limit pin.

16. A vibration damper assembly as set forth in claim 10, in which the spring sets within each group vary in their deflection rates so that when torque is applied, the spring sets will vary in their degree of compression.

17. A vibration damper assembly as set forth in claim 10, in which the spring sets within each group have equal deflection rates so that when torque is applied, the spring sets will have equal degrees of compression.

18. A vibration damper assembly as set forth in claim 10, in which each spring set comprises three concentric springs.

19. A vibration damper assembly as set forth in claim 5, including at least one friction shim located between the annular body portions of said floating members.

20. A vibration damper assembly to transmit torque between two elements comprising a hub operatively connected to an output shaft, mounting means operatively associated with torque input means, said hub having two or more radially extending arms, floating means including one or more members which are guided independently of each other in a circumferential path about said hub, each floating member comprising a pair of annular plates positioned on opposite sides of said hub, each plate including at least one outwardly extending arm having an inwardly offset base portion, an outwardly and then inwardly curved retaining portion and terminating in a radial edge, said plates having the offset base portions and radial edges aligned in abutting relation, and means securing said base portions together, resilient means interposed between each of said hub arms and floating member arms, and driving means operatively connected to said mounting means and extending inwardly into the path of and adapted to engage said resilient means.

21. A vibration damper assembly as set forth in claim 20, in which said curved retaining portions are partially cut away to provide said circumferentially extending lips.

22. A vibration damper assembly as set forth in claim 21, in which said radial edges are cut away at one end of said lips to form a notch receiving a portion of said driving means therein during operation.

23. A vibration damper assembly as set forth in claim 1, in which said hub arms and floating means provide a plurality of spring pockets, and said resilient means comprises two groups of springs acting in parallel and located diametrically oppositely in said damper assembly, each group of springs including several sets of springs.

24. A vibration damper assembly as set forth in claim 23, in which each spring group includes three spring sets arranged around one-half the circumference of the damper assembly, each spring set including three concentrically arranged springs.

25. A vibration damper assembly as set forth in claim 24, in which the springs of each spring set vary in their deflection rates.

26. A vibration damper assembly to transmit torque between two elements comprising a hub operatively connected to an output shaft, mounting means operatively associated with torque input means, said hub having a central body portion and two or more radially extending arms with outwardly diverging sides on each hub arm terminating in circumferentially extending lips, each hub arm having a central circumferentially extending slot through the arm and lips and extending inwardly to terminate adjacent said body portion, driving means including two or more drive members, each member having a base secured to said mounting means and an offset tang extending into the slot in a hub arm, each tang having outwardly diverging edges corresponding to the sides of a hub arm, floating means adapted to move arcuately about the hub relative to said arms and comprising at least one floating member journalled on said hub body portion and having one or more outwardly extending arms terminating in circumferentially extending lips, each floating member including a pair of mirror-image plates located on opposite sides of said hub, each plate having an annular body portion and one or more arms with inwardly offset base portions and outwardly and inwardly curved lip portions, said base portions of the opposite plates being secured together, said plates of each floating member on each side of the hub being in frictional engagement with said arms being arcuately spaced apart, and resilient means interposed between each of said hub arms and floating member arms and comprising two or more groups of spring sets acting in parallel, said hub arms and lips and said floating member arms and lips forming pockets to receive said spring sets, each spring set including two or more concentrically arranged springs, said drive members extending into the path of and adapted to engage said resilient means.

27. A vibration damper assembly as set forth in claim 26, including one or more limit pins received in spring sets of each group abutting the hub arms with the pins positioned within the inner springs of the spring sets, each limit pin having an enlarged head adjacent the hub arm.

28. A vibration damper as set forth in claim 26, including one or more friction shims located between at least one pair of plates.

29. A vibration damper assembly as set forth in claim 26, in which the edges of each hub arm and tang received therein have recesses forming a pocket adapted to receive the enlarged head of a limit pin.

30. A vibration damper assembly as set forth in claim 26, in which said hub body portion has a central splined opening receiving the output shaft with a counterbore facing the mounting means, and said mounting means has a central opening defined by an annular flange received in said counterbore.

31. A vibration damper assembly as set forth in claim 26, in which said hub has a pair of oppositely disposed arms, a pair of drive members positioned diametrically oppositely on said mounting means, a pair of floating members journalled on the hub body portion, each floating member having a pair of oppositely disposed arms, said hub arms and floating member arms forming six spring pockets therebetween, two groups of spring sets, and a pair of limit pins cooperating with each hub arm.

32. A vibration damper assembly as set forth in claim 26, in which said hub has a pair of oppositely disposed arms, a pair of drive members positioned diametrically oppositely on said mounting means, a floating member journalled on said hub body portion and having a pair of oppositely disposed arms, said hub arms and floating member arms forming four spring pockets therebetween, and two groups of spring sets with two spring sets in each group.

33. A vibration damper assembly as set forth in claim 26, in which said hub has three circumferentially equally spaced hub arms, three drive members circumferentially equally spaced on said mounting means, three floating members journalled on said hub body, each floating member having a single radially extending arm positioned between two adjacent hub arms, said hub arms and said floating member arms forming six spring pockets therebetween, and three groups of spring sets with two spring sets in each group.

34. A vibration damper assembly as set forth in claim 26, in which said hub has three circumferentially equally spaced hub arms, three drive members positioned on said mounting means in radial alignment with said hub arms, a floating member journalled on said hub body and having three circumferentially equally spaced radially extending arms thereon, said hub arms and floating arms forming six spring pockets therebetween and three groups of spring sets received in the pockets with two spring sets in each group.

35. A vibration damper assembly as set forth in claim 27, wherein said limit pins act to alter the deflection characteristic of the damper assembly by limiting the deflection of one or more spring sets.

* * * * *